United States Patent
Burrow (10) Patent No.: US 10,099,856 B2
(45) Date of Patent: Oct. 16, 2018

(54) CONVERTIBLE PALLET JACK WITH ROLLERS

(71) Applicant: Roy C. Burrow, Gwynn Oak, MD (US)

(72) Inventor: Roy C. Burrow, Gwynn Oak, MD (US)

( * ) Notice: Subject to any disclaimer, the term of this patent is extended or adjusted under 35 U.S.C. 154(b) by 20 days.

(21) Appl. No.: 15/384,517

(22) Filed: Dec. 20, 2016

(65) Prior Publication Data
US 2017/0260001 A1    Sep. 14, 2017

Related U.S. Application Data

(62) Division of application No. 15/066,628, filed on Mar. 10, 2016, now abandoned.

(51) Int. Cl.
| | | |
|---|---|---|
| *B65G 13/11* | (2006.01) | |
| *B65G 13/00* | (2006.01) | |
| *B62B 3/06* | (2006.01) | |

(52) U.S. Cl.
CPC ................ *B65G 13/00* (2013.01); *B62B 3/06* (2013.01); *B60Y 2410/124* (2013.01); *B62B 2203/20* (2013.01); *B62B 2203/74* (2013.01)

(58) Field of Classification Search
CPC ................................ B65G 13/11; B65G 13/12
USPC ........................................ 414/607, 534, 471
See application file for complete search history.

(56) References Cited

U.S. PATENT DOCUMENTS

| | | | | | |
|---|---|---|---|---|---|
| 3,250,437 | A | * | 5/1966 | Smith | B60P 3/22 137/355.16 |
| 3,294,263 | A | * | 12/1966 | Naden | B60P 1/52 193/35 SS |
| 3,961,715 | A | * | 6/1976 | Ellen | B60P 1/52 296/16 |
| 4,930,612 | A | * | 6/1990 | Thorndyke | B65G 13/12 193/35 SS |
| 6,193,043 | B1 | * | 2/2001 | Langston | B65G 13/11 193/35 SS |
| 2015/0013084 | A1 | * | 1/2015 | Burrow | B65G 69/30 14/72.5 |

FOREIGN PATENT DOCUMENTS

WO    WO-2013055214 A1 *  4/2013  ............... B66F 9/12

* cited by examiner

*Primary Examiner* — Jonathan Snelting
(74) *Attorney, Agent, or Firm* — Vincent G. LoTempio; Kloss, Stenger & LoTempio; David T. Stephenson (57) ABSTRACT

A pallet jack has a forked platform with rollers embedded in the arms of the fork. The rollers are located at intervals from the front of the arms to the rear. The rollers work in conjunction with an inclined ramp, also having embedded rollers, attached to the front of the arms to lift a container onto the forks. Once a container is aligned in front of the inclined ramp, the pallet jack is driven forward. The momentum of the pallet jack, at standard speed, causes the inclined ramp to insert underneath the container and lifts the container onto the arms. The rollers allow the container to move into position on the pallet jack for transfer. An overlay platform may cover the host forks for standard pallet transfer. The overlay platform may have embedded rollers and can be rotated into position over a standard fork.

15 Claims, 6 Drawing Sheets

CONVERTIBLE PALLET JACK WITH ROLLERS

This application is a divisional of U.S. application Ser. No. 15/066,628, filed on Mar. 10, 2016. No new matter has been introduced.

BACKGROUND

The present disclosure relates to pallet jacks with hydraulic lift that may be used in industry for lifting and transporting loaded pallets and other containers and for unloading at new locations. Transporting containers in an industrial setting is a process that has been refined and standardized over many years. Typically, pallets are designed to be compatible with standard pallet jacks to automate loading and unloading.

In the art of material handling, pallets jacks typically include wheeled devices intended for the manual lifting of a pallet, with a load resting thereon, to transport the pallet and load from one work area to another. U.S. Pat. No. 4,589,669 discloses an exemplary pallet jack, or hydraulic pallet truck. Pallet jacks typically include forked support arms upon which extensible rollers are mounted at terminal ends. The opposing ends of the forked support arms are typically connected to one another and attached in some fashion to a pivotal wheel with a hydraulic lift. The pivotal wheel allows the user to steer the pallet jack when either pushing or pulling the pallet jack. The hydraulic lift is operatively connected to the wheel and the extensible rollers to raise and lower the support arms to engage and transport the pallet or to disengage the pallet jack from the pallet.

Due to the generally standardized nature of industrial pallets, pallet jacks are designed to be compatible only with the standard pallet opening. The standard pallet has openings that are matched in size to the forked support arms. The forked support arms insert into openings, and once fully inserted, allow the operator to use the hydraulic system to lift the pallet and its contents. However, pallet openings are not always of standard size, thereby creating the potential for an operator to be forced to leave the pallet, or risk damaging the pallet by attempting to use incompatible support arms.

Further, a standard pallet jack is unable to lift containers that have no slots for a standard pallet jack. Therefore, there is a need, particularly as global trade has increased, for pallet jacks to handle various types of containers, beyond the standard pallet. Such containers include palletized and unpalletized freight, trays, cartons, and boxes.

Therefore, there is a need for a pallet jack that can accommodate all variety of containers.

SUMMARY

The present disclosure overcomes the limitations of existing pallet jacks by introducing forked support arms having embedded rollers, which allows a container to be moved without resistance onto the forked support arms having rollers. The forked support arms of the present disclosure operate in conjunction with an inclined ramp, also having rollers, for moving a container onto the forked support arms. The inclined ramp may be pivotable.

The inclined ramp attaches to a standard pallet jack with an attachment axle which may be fused or welded to the front of the host support arms. In some embodiments, underneath the front of the inclined ramp may be a roller, which allows the ramp to move in conjunction with the pallet jack. At the front edge of the ramp may be a flexible hinged and tapered lip which interacts with the bottom edge of the container to slide underneath the container with limited impact, allowing the container to move onto the inclined ramp. Transference of a container from the floor to the horizontal platform, in the present disclosure, generally takes place within 3 to 5 seconds in a single continuous motion.

The present disclosure allows a container to be transferred from a floor onto the pallet jack without requiring a vertical lifting force or an external attachment to a container; rather, the standard forward motion of the pallet jack is sufficient to transfer the container from the floor to the horizontal plane. The attached inclined ramp is moved in the direction of the container and the momentum of the pallet jack, at standard speed, acts as a wedge to create a force on the container sufficient to lift the container onto the forked support arms.

The rollers embedded in the forked support arms then allow the container to move into proper position on the pallet jack for transference without the need for manual force, or any additional force beyond the momentum of the pallet jack, applied to the container. The rollers affixed to the electric pallet jack forks may be of a durable hardened solid steel type. Rollers in the inclined ramp may be easily interchangeable.

The speed that the pallet jack must travel to facilitate transfer of the container onto the pallet jack may vary depending on the type of material freight being transferred. However the design of the apparatus allows slow to moderate operation of the pallet jack to generally achieve sufficient results.

In one embodiment of the present disclosure, the forked support arms having rollers are provided as an overlay attachment to existing standard forked support arms. Here, the overlay platform with rollers is attached by a hinge at the joint between the bulkhead and the end of the forked support arms proximal to the bulkhead of a standard pallet jack. The overlay platform is locked in the vertical position when not in use, either by a pin, or attachment to existing structures on the pallet jack.

When lowered into a horizontal position, the roller overlay support arms, where the rollers are in the overlay platform attached to a standard pallet jack, transform a standard pallet jack into a pallet jack that can work in conjunction with an attachable inclined ramp or wedge, as described above, to allow the above described process of loading a container on to the device of the present disclosure. This system allows a wide variety of containers to be loaded onto a pallet jack. In another embodiment of the present disclosure, the original host forked support arms of the pallet jack may consist of embedded rollers while the overlay platform support arms, are framed solid without rollers, allowing the pallet jack to convert back to the function of a standard pallet jack. Here, solid overlay support arms, without rollers, may be attached to the pallet jack and rotate down to allow the pallet jack with embedded rollers to work like a standard pallet jack.

The rollers in the support arms span the entire length of the arms. The inclined ramp can be attached to existing components of the forked support arm and added when an unpalletized container or non-standard pallet is necessary to be loaded. The design of the inclined ramp allows the forward momentum of the pallet jack to drive the container onto the rollers in the forked support arms.

DESCRIPTION OF DRAWINGS

The present invention and the manner in which it may be practiced is further illustrated with reference to the accompanying drawings wherein.

DETAILED DESCRIPTION

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112. As used in the following description, the terms "horizontal", "vertical", "left", "right", "up", "down", as well as adjectival and adverbial derivatives thereof (e.g., "horizontally", "vertically", "upwardly", etc.) simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
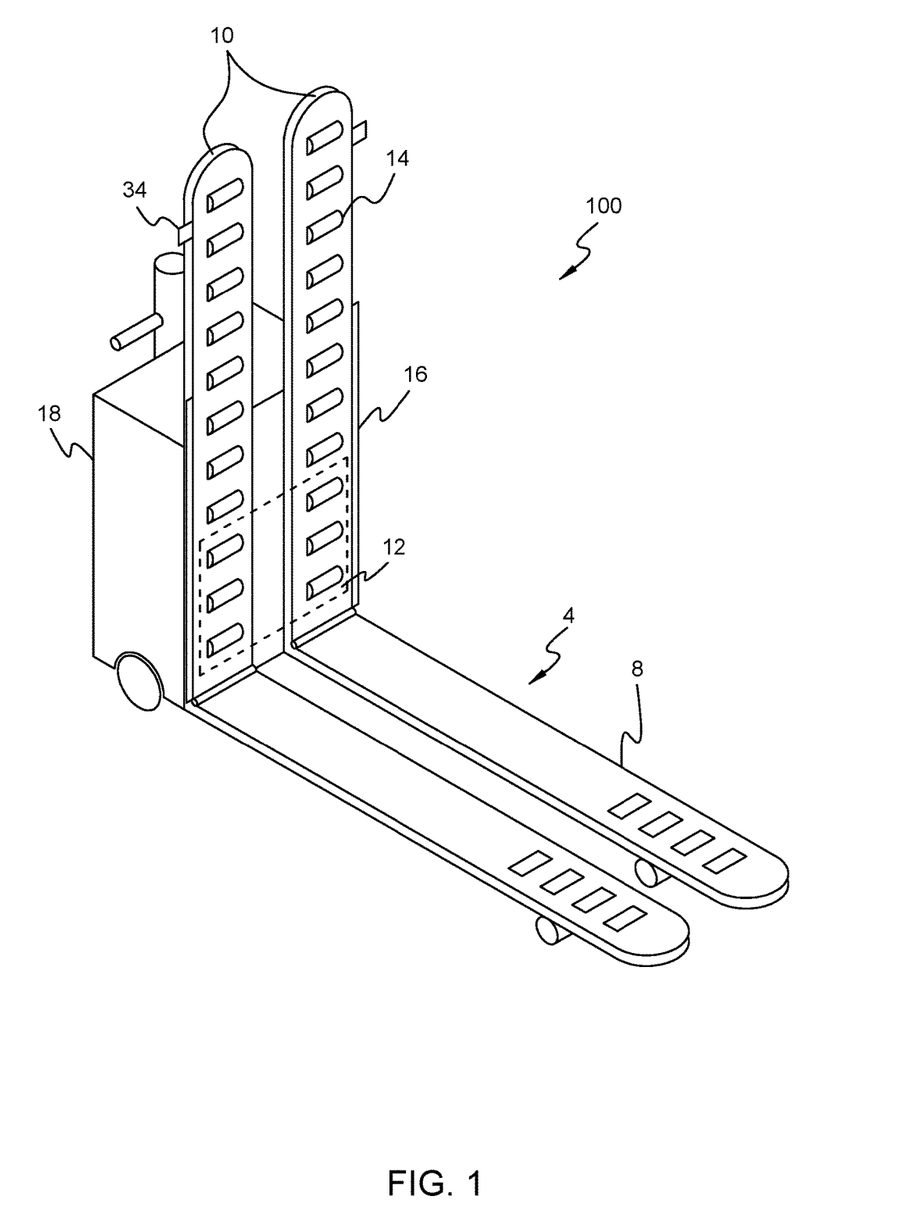
FIG. 1 is a perspective view of the roller overlay platform with rollers in an attachment on a pallet jack.

FIGS. 1-5 show external views, from various perspectives, of a pallet jack 100 and rollers 14 of the present disclosure, including two different embodiments. FIG. 1 shows a perspective view of a first embodiment of pallet jack 100. The pallet jack 100 has a host platform 4 with a pair of planar host support arms 8. To switch from a standard operating pallet jack 100 to a pallet jack that can transport unpalleted containers such as boxes, the present disclosure includes roller overlay support arms 10 that are illustrated in the vertical position and can be seen extending vertically from the bulkhead 12 adjacent the battery concealment box 18 and planar host support arms 8.

The rollers 14 are longitudinal and are embedded in the roller overlay support arms 10. The rollers 14 are located at intervals along each of the roller overlay support arms 10 in order to allow a container to travel unimpeded by friction with the flat immobile surface of the roller overlay support arms 10 that lie between each roller 14. The rollers 14 may include a central shaft to allow the rollers 14 to rotate. The central shaft may be rotatably connected to a roller overlay support arm side bracket which may be positioned on opposing sides of the roller overlay support arm and which may be connected to the bottom wall of the forked support arm so that objects which may be placed on the roller overlay support arm 10 may be moved along the rollers 14.

The rollers 14 of the roller overlay support arms 10 do not extend below the bottom surface of the roller overlay support arm 10, and therefore may rotate freely as a container moves along the rollers 14. The pallet jack bulkhead 16 is shown adjacent the roller overlay supports arms 10. Battery concealment box 18 lies at the proximal end of the planar host support arms 10.

Figure 2:
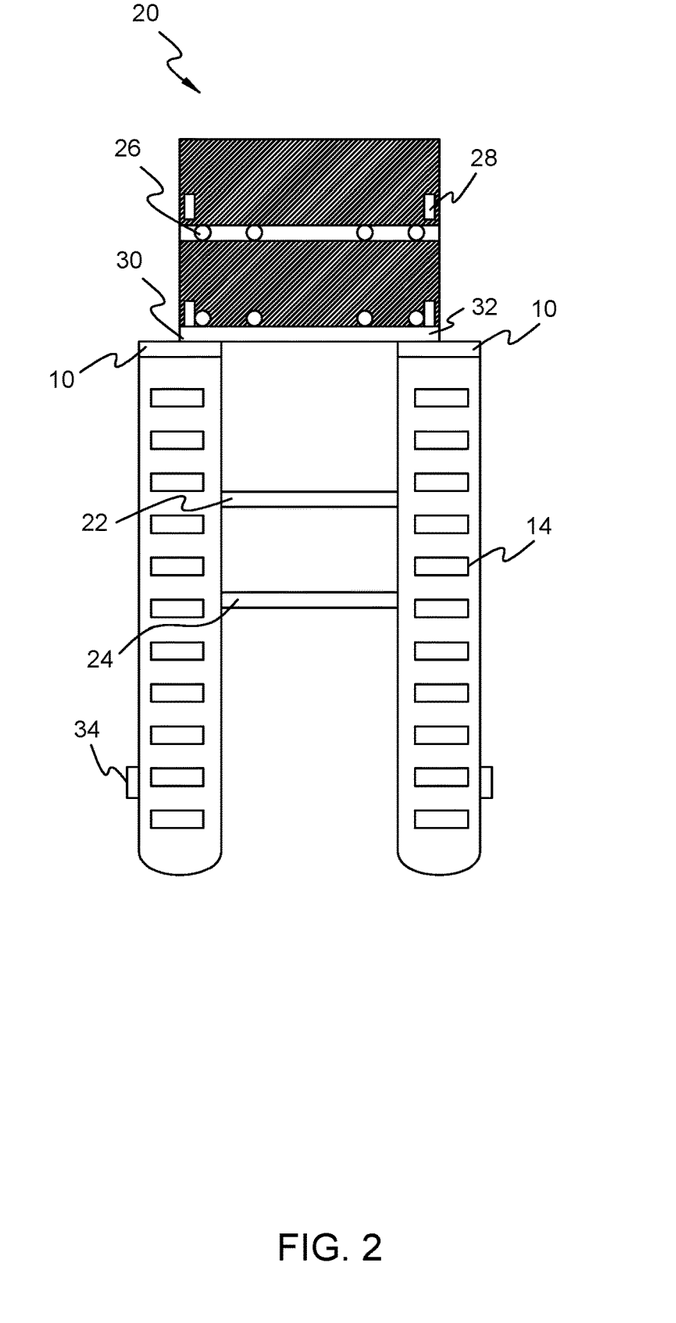
FIG. 2 is a front view of the roller overlay platform with rollers in an attachment on a pallet jack adjacent the bulkhead.

FIG. 2 shows the roller overlay support arms 10 containing rollers 14. The roller overlay support arms 10 may have an inner fork stabilizer 22 and an outer fork stabilizer 24 linking the two roller overlay support arms 10. Bulkhead screws 26 secure the bulkhead 12 to the battery concealment box 18. When in the vertical position, the roller overlay support arms 10 are held in place through attachment of a pin with a pin and clip lock mechanism where the pin receptor is attached to the pallet jack bulkhead 12, or optionally using a clip or tie attached to slotted opening 28.

The roller overlay support arms 10 are attached to the planar host support arms 8 via a hinge 30 and an axle 32. The hinge 30 and axle 32 join the planar host support arms 8 and the roller overlay support arms 12. Hinge 30 allows the roller overlay support arm 12 to rotate 90 degrees from the vertical position to the horizontal position on top of the planar host support arms 8.

Once in the horizontal position, the roller overlay support arms 10 contact, and completely cover, host support arms 8 while still allowing free rotation of rollers 14. Overhanging horizontal stabilizers 34 attached to the roller overlay support arms 12 contact the planar host support arms 8 in order to prevent lateral movement of the roller overlay support arms 12 once in the horizontal position.

In some embodiments, both the planar host support arms 8 and the roller overlay support arms 12 may be removed and used interchangeably through the use of a common hinge and axle. In some embodiments, the planar host support arms 8 may be adjustable in length from the rear the arm. In some embodiments, the rollers 14 may recede to the level of the surrounding surface of roller overlay support arm 12, depending on the amount of pressure applied by the container, or through manual mechanical adjustment. The rollers 14 may also ascend vertically above said surface up to ¾ inches.

Figure 3:
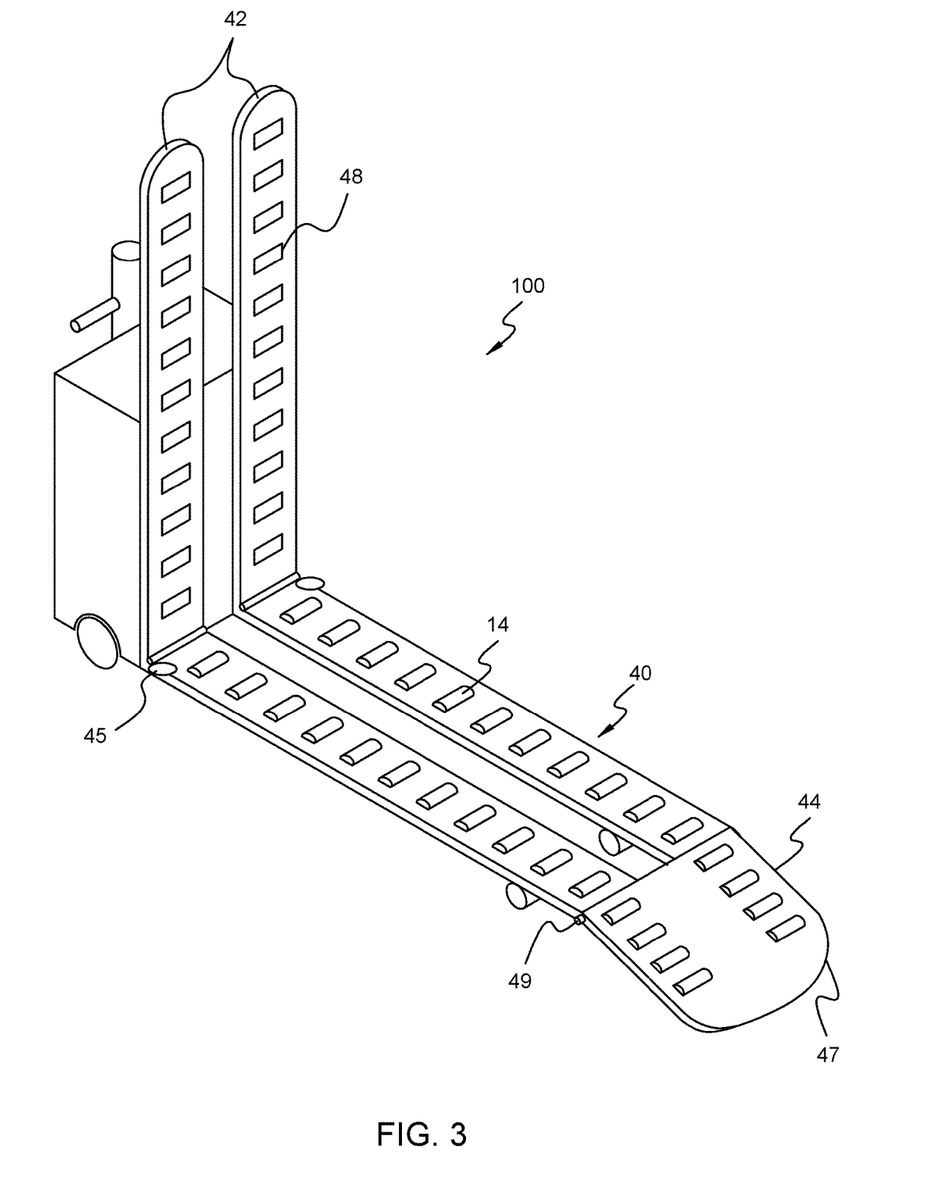
FIG. 3 is a perspective view of the roller host platform with rollers in the host support arms of the pallet jack.

FIG. 3 shows another embodiment of the present disclosure, wherein the overlay support arms are planar, rather than containing embedded rollers 14, while the host support arms have the embedded rollers 14. In this embodiment, the role of the planar overlay support arms 42 is to return the function of the pallet jack 100 to that of a standard pallet jack, for use with pallets rather than unpalleted containers. Therefore, in this embodiment, the combined height of the host platform and the planar overlay platform, when the planar overlay platform is in contact with the host platform, does not exceed the height of the opening of a standard pallet slot.

FIG. 3 further shows an attached inclined ramp 44. In one embodiment, the planar overlay support arms 42 have gaps 48 corresponding to the location of the rollers 14 when the planar overlay support arms 42 are laid flat on the roller host support arms 40.

When the standard forward motion of the pallet jack 100 is driven toward a container, the momentum of the pallet jack 100 is sufficient to transfer a container from the floor to the horizontal plane of the roller host support arms 40. The attached inclined ramp 44 is moved in the direction of the container and the momentum of the pallet jack 100, at standard speed, acts as a wedge to create a force on the container sufficient to lift the container onto the roller host support arms 40. The rollers in the embedded roller host support arms 40 then allow the container to move into proper position on the pallet jack for transference without the need for manual force, or any additional force, beyond the momentum of the pallet jack, applied to the container.

The structure of the rollers 14 are longitudinal and extend the length of the roller host supports arms 40. The rollers 14 may include a central shaft to allow the rollers 14 to rotate. The central shaft may be rotatably connected to a forked support arm side bracket which may be positioned on opposing sides of the roller host support arm 40 and which may be connected to the bottom wall of the roller host support arm 40 so that objects which may be placed on the forked support arms may be moved along the rollers 14 unimpeded.

The inclined ramp 44 may have a surface of ⅜" thick flat metal surface to afford structural soundness, and ⅜" thick welded, angled sides, congruent to the overall wedge shape. The underside of the flat surface of inclined ramp 44, in one embodiment of the present disclosure, has welded cross sections of metal girders. At the front of the inclined ramp 44 is a tangent curve tapered leading edge lip 47, or second inclined ramp bulkhead plate which may be pivotably connected to the inclined ramp 44 by a hinge so that lip 47 may pivot with respect to the inclined ramp 44 in order to provide a smooth transition to the support surface. The lip 47 may be attached to the ramp by metal axle. (this tangent curve is unique to performance of interjection in that it is the minimal leading edge that is first introduced to the footless border and presents the tapered curved surface to minimize resistance. The inclined ramp 44 is truncated flat ramp, generally at an angle of approximately 45 degrees from the floor to the horizontal platform to provides less material surface resistance to edges and footless bottoms. In one embodiment the inclined ramp 44 measures 31 inches from tip to tip.

The rollers 14, in both the forked support arms and the inclined ramp 44 allow minimal resistance and fluidity of motion when transferring materials from a stationary position on a floor onto the horizontal platform of a pallet jack 100. Rollers 14 also allow for the unloading of containers from the pallet jack 100 onto a flat surface by providing a means to grasp a container manually while the electric pallet jack 100 is reversed, or by manually pushing a container off the pallet jack 100.

The inclining capacity of inclined ramp 44 and leading edge lip 47 are independent of each other such that the lip 47 stays in touch with the surface regardless of the angle of the inclined ramp 44 being in the raised position with respect to the upmost positioning of the pallet jack 100, and maintains the ability to insert the inclined ramp 44 beneath a container regardless of variations in conditions. This aspect of the inclined ramp 44 allows the lip 47 to avoid being affected by the positioning of the vertical height of inclined ramp 44. The inclined ramp 44 therefore forms a singular piece to allow for efficient transition of a container; with only the force of the momentum of the pallet jack 100 to move the container onto the roller host support arms 40.

A small fraction of the roller 14 on inclined ramp 44 may come through the top surface opening of the inclined ramp 44 to come in contact with the bottom surface of the container, thereby minimizing friction and distributing container weight in a fluid motion. The truncated shape of inclined ramp 44 may have a top and bottom where the top and bottom sides are equally symmetrical in a T shape.

The openings within the center metal structural frame allow for insertion of rollers 14 into inclined ramp 44 in rows so as not to inhibit the structural strength of the inclined ramp 44. The main body of inclined ramp 44 may be forged from a single sheet of ⅜ inch thick metal with openings for the rollers 14 cut out of the center of the body surface allowing the integrity of the single sheet of metal to remain structurally uncompromised.

The rollers 14 may be equipped with adjustable, collapsible pins that allow them to snap into pre-drilled and set-hole openings configured within the angled side walls of both the forked support arms. The sides of the inclined ramp 44 are angled to support strength and promote its effectiveness as an overall wedge. Viewed from the side the tangent curve lip 47 is visible, as shown in FIG. 3. The angled shape of inclined ramp 44 allows insertion beneath footless containers while providing ascension of a container on the floor to the forked support arms of the pallet jack 100.

The planar overlay platform for the roller host support arms 40 are at a thickness of height so as to nullify the function of the rollers of the pallet jack fork ramps; this feature allows for a pallet jack 100 having rollers 14 in the roller host support arms 40 to function as a standard pallet jack, which utilizes vertical force and friction to lift a pallet and hold it in place.

Gear holes 49 in the sides of the pallet jack support arms offer another means of attaching the inclined ramp 44 to the front end of pallet jack 100, and allow the inclined ramp 44 to be hydraulically lifted and vertically pivot so as not allow the inclined ramp 44 to drag on the floor after loading or unloading a container, or to create a different angle of the inclined ramp 44 with the floor. Vertical rotation of the inclined ramp 44 can also act as a stopping mechanism for containers already being transported on the horizontal surface of the pallet jack 100. In one embodiment, gear holes are the pivotal points of the vertical and or horizontal movement of the inclined ramp 44. The leading edge of lip 47 of the inclined ramp 44 may swivel perpendicularly to give and support an angled lift onto the main body horizontal surface of the inclined ramp 44.

Figure 4:
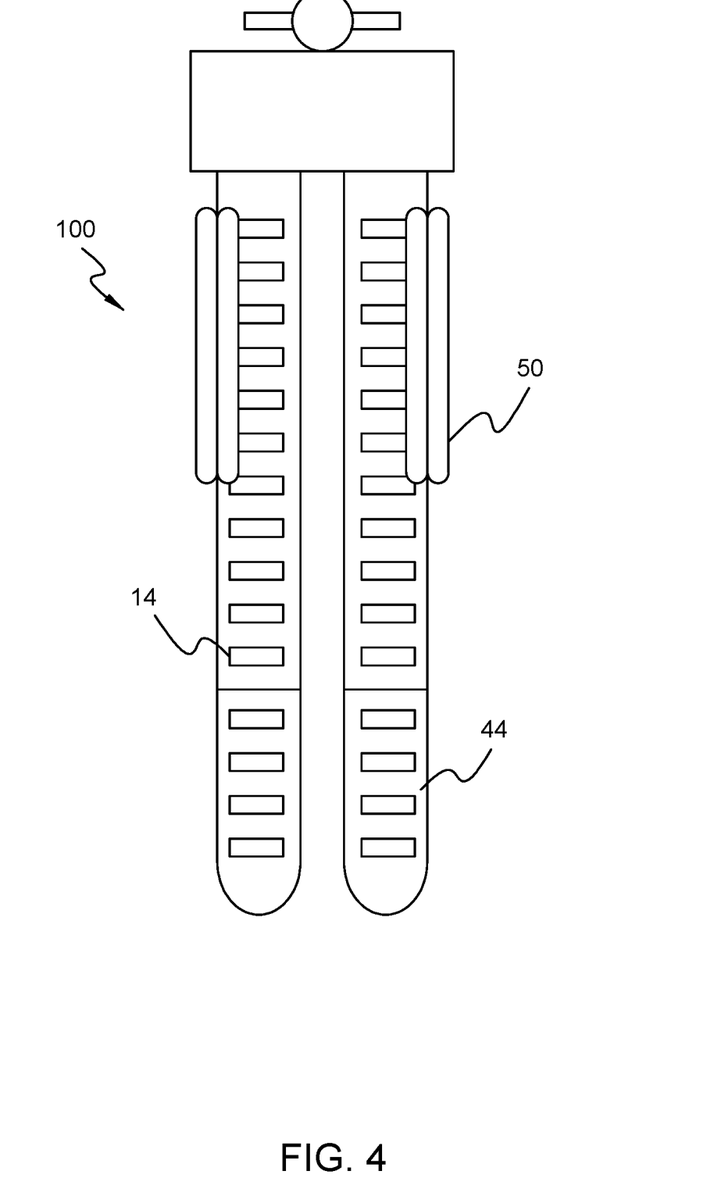
FIG. 4 is a top view of the pallet jack with the rollers in the host support arms of the pallet jack, also showing the guide rails in an upright position.

FIG. 4 shows guide rails 50, which may be hydraulically operated to offer horizontal to vertical-plus motion range to act as a guide or locking mechanism for freight already loaded onto the horizontal surface of pallet jack 100. Rear end adjustable host ramp extensions 45 have bushing pins that may fit into pre-drilled and positioned slot holes to allow host fork-ramps to extend forward (shown in FIG. 3), thereby increasing their length. Guide rails 50 may rotate horizontal to vertical 75 degree rotating hydraulically. Guide rails 50 can operate from the relaxed horizontal position to vertical to serve as a guide, dependent on to the width of the container and also to lock in freight from the bottom side edge of the boxes or crates from pressure of the guide rails 50. Rollers 14 may be variable in pattern and may include cylinders or balls.

FIG. 4 is a top view of the pallet jack 100 having embedded roller host arms 40. Guide rails 50 are shown adjacent embedded roller host arms 40. Guide rails 50 may fold up on a hinge to keep a container from sliding off the pallet jack 100. The guide rails 50 may also be detachable. Guide rails 50 may be hydraulically controlled.

Figure 5:
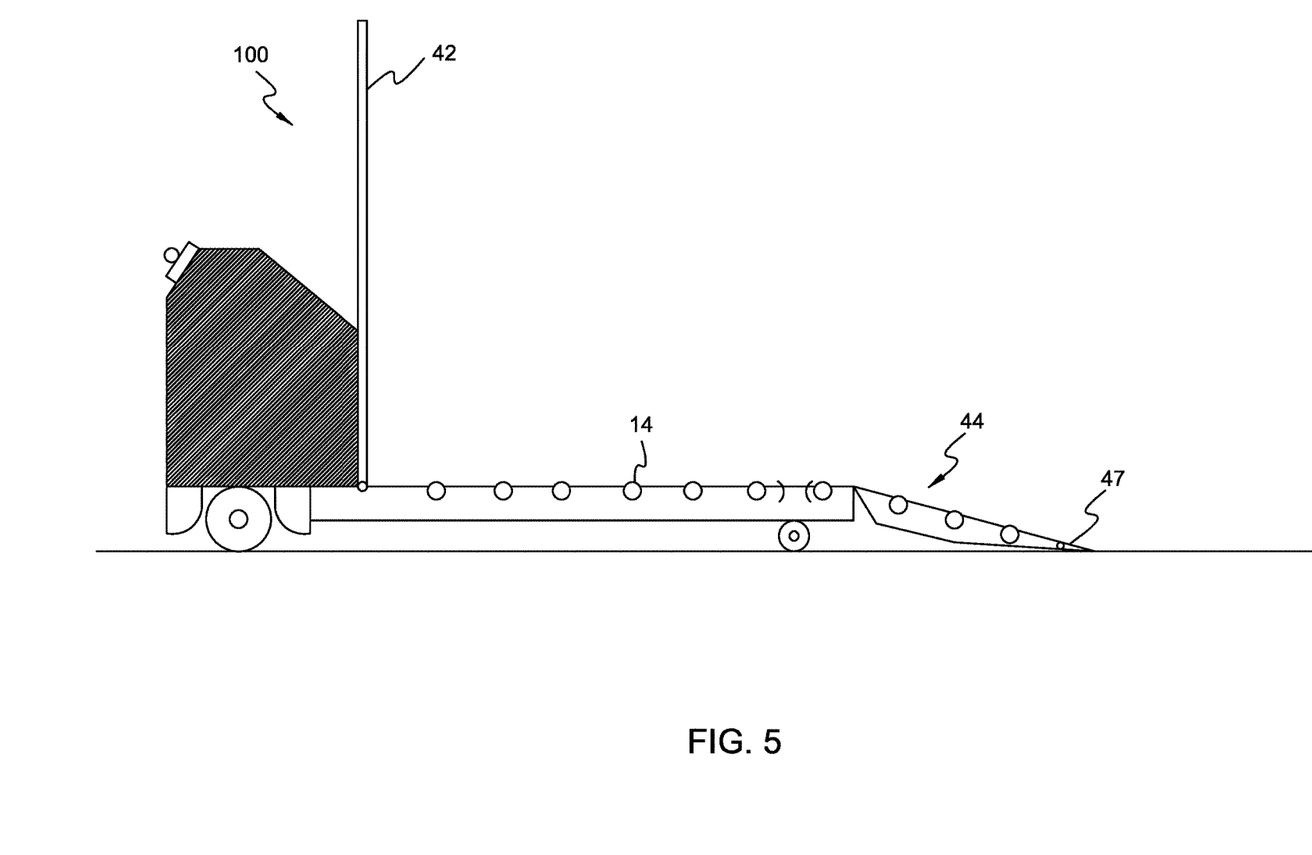
FIG. 5 is a side elevational view showing the rollers in the host support arms of the pallet jack in conjunction with the inclined ramp.
Figure 6:
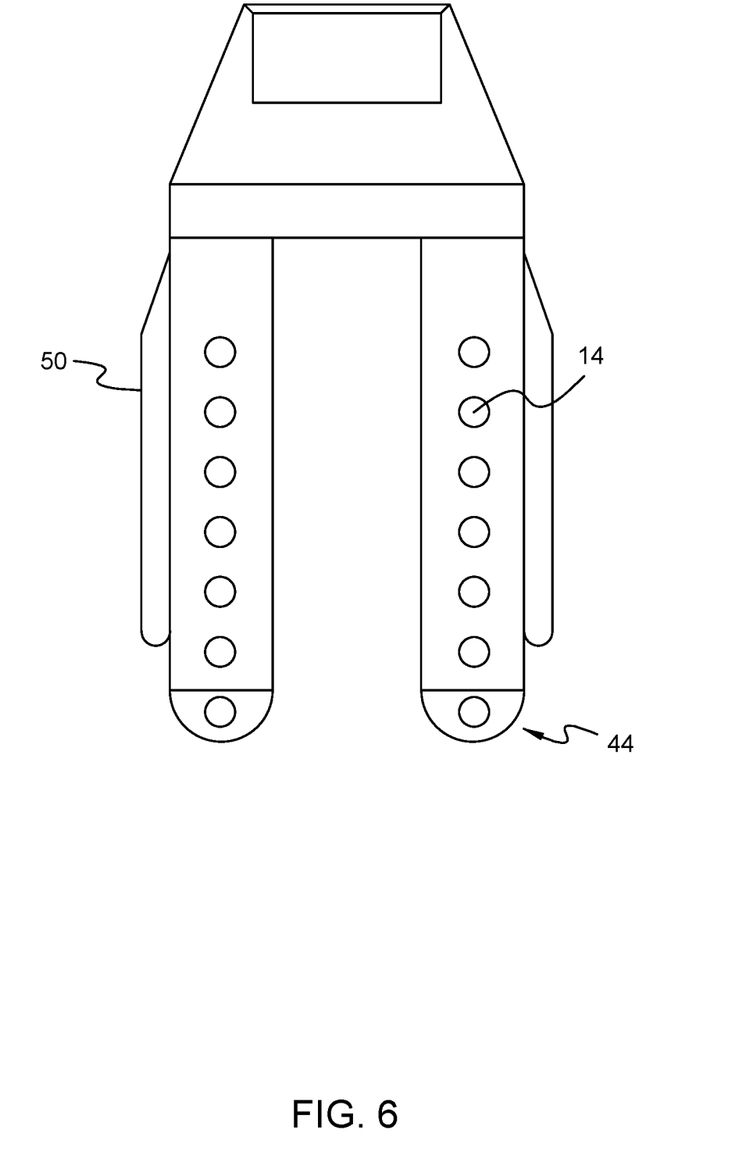
FIG. 6 is a top view of the rollers in the host support arms of the pallet jack in conjunction with the inclined ramp, where the rollers are generally spherical in shape.

FIG. 5 is a side view of the pallet jack 100 having embedded roller host arms 40. Planar overlay support arms 42 are shown in the vertical position. Rollers 14 are shown in the inclined bulkhead plate 44 and embedded roller host arms 40. FIG. 6 show rollers 14 in an alternative shape, with round ball rollers rather than longitudinal cylindrical rollers.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

I claim:

1. A pallet jack comprising:
    host support arms for supporting a load positioned thereon; the host support arms having proximal ends and distal ends; the proximal ends being adjacent to a bulkhead; the distal ends being removably attached to an inclined ramp;
    wherein said inclined ramp has rollers embedded within such that the rollers rise above a top surface of the inclined ramp in a manner sufficient to allow a container to move across the top surface of the inclined ramp unimpeded onto an overlay platform;
    wherein the overlay platform is attached at a base of a host bulkhead such that the overlay platform may rotate from a vertical position to a horizontal position to cover the host support arms; and
    wherein the overlay platform has rollers embedded in roller overlay support arms such that when the overlay platform is in the horizontal position, at least a portion of the rollers rise above a top surface of the roller overlay support arms to allow the container to roll across the top surface of the roller overlay support arms unimpeded.

2. The pallet jack of claim 1, wherein the overlay platform generally matching a shape of the host support arms is attached by a hinge at a base of the bulkhead such that the overlay platform may rotate from the vertical position to a horizontal position to cover the host support arms.

3. The pallet jack of claim 1, wherein the overlay platform is attached to the host support arms via the hinge and an overlay platform axle.

4. The pallet jack of claim 1, wherein the inclined ramp attaches to an axle mounted on distal ends of the host support arms.

5. The pallet jack of claim 1, wherein the inclined ramp is attached to gear holes in outer sides of the host support arms to allow the inclined ramp to be hydraulically lifted and vertically pivot so as not allow the inclined ramp to drag on a floor after loading or unloading the container.

6. The pallet jack of claim 1, wherein the inclined ramp is attached to the pallet jack via an axle welded to the pallet jack.

7. The pallet jack of claim 1, wherein the rollers in the overlay platform are configured to with a suspension system such that the rollers may lower under sufficient weight.

8. A pallet jack comprising:
    host support arms integral with the pallet jack for supporting a load positioned thereon; the host support arms having proximal and distal ends; the proximal ends being adjacent to a host bulkhead;
    wherein an overlay platform generally matching a shape of the host support arms of the pallet jack is attached by a hinge at a base of the host bulkhead such that the overlay platform may rotate from a vertical position to a horizontal position to cover the host support arms; and
    wherein said overlay platform has rollers embedded in roller overlay support arms such that when the overlay platform is in the horizontal position, at least a portion of the rollers rise above a top surface of the overlay platform to allow a container to roll across the top surface of the roller overlay support arms unimpeded.

9. The pallet jack of claim 8, wherein the overlay platform is held in the vertical position by a pin and clip attachment with the host bulkhead.

10. The pallet jack of claim 8, wherein the overlay platform is locked in the vertical position using a clip or tie attached to a slotted opening.

11. The pallet jack of claim 8, wherein the host support arms are attached to at least two rotatable guard rails.

12. The pallet jack of claim 8, wherein the support arms of the overlay platform are connected by at least one fork stabilizer.

13. The pallet jack of claim 8, wherein the rollers are spherical in shape.

14. The pallet jack of claim 8, wherein the host support arms are extendable.

15. A method comprising:
    rotatably attaching an overlay platform having roller overlay support arms to a bulkhead at a proximal end of host support arms of a pallet jack; wherein a shape of the overlay platform generally matches a shape of the host support arms of the pallet jack and is attached by a hinge at a base of a host bulkhead such that the overlay platform may rotate from a vertical position to a horizontal position to cover the host support arms;
    attaching an inclined ramp having a plurality of rollers embedded within to a distal end of the host support arms; and
    rotatably lowering the overlay platform from the vertical position to a horizontal position in contact with the host support arms.

* * * * *